United States Patent
Ito et al.

(10) Patent No.: US 9,204,707 B2
(45) Date of Patent: Dec. 8, 2015

(54) SHOULDER HARNESS FOR PORTABLE WORK MACHINE

(71) Applicant: Yamabiko Corporation, Tokyo (JP)

(72) Inventors: Tomoki Ito, Tokyo (JP); Masaki Takeda, Tokyo (JP); Keita Kamo, Tokyo (JP)

(73) Assignee: Yamabiko Corporation, Tokyo (JP)

( * ) Notice: Subject to any disclaimer, the term of this patent is extended or adjusted under 35 U.S.C. 154(b) by 0 days.

(21) Appl. No.: 14/461,452

(22) Filed: Aug. 18, 2014

(65) Prior Publication Data

US 2015/0053731 A1 Feb. 26, 2015

(30) Foreign Application Priority Data

Aug. 21, 2013 (JP) .................. 2013-171630

(51) Int. Cl.
- *A45F 3/14* (2006.01)
- *A45F 3/10* (2006.01)
- *B27B 17/00* (2006.01)

(52) U.S. Cl.
CPC ... *A45F 3/10* (2013.01); *A45F 3/14* (2013.01); *B27B 17/0008* (2013.01); *B27B 17/0083* (2013.01); *A45F 2003/146* (2013.01); *A45F 2200/0575* (2013.01)

(58) Field of Classification Search
CPC .............................. A45F 3/14; A45F 2003/146
USPC .......................... 224/259, 907, 262, 637, 348
See application file for complete search history.

(56) References Cited

U.S. PATENT DOCUMENTS

| 5,913,464 | A | 6/1999 | Haberlein | |
| 6,247,624 | B1 | 6/2001 | Rundberg | |
| 8,910,840 | B2 * | 12/2014 | Kamo et al. | 224/268 |

FOREIGN PATENT DOCUMENTS

| EP | 1661446 A1 | 5/2006 |
| EP | 2653063 A1 | 10/2013 |
| JP | 2005-143453 | 6/2005 |
| WO | 2008076010 A1 | 6/2008 |
| WO | 2008147256 A1 | 12/2008 |

OTHER PUBLICATIONS

Extended European Search Report issued in corresponding European Patent Application No. 14 181 389.9 dated Feb. 23, 2015 (8 pages).

* cited by examiner

*Primary Examiner* — Brian D Nash
*Assistant Examiner* — Corey Skurdal
(74) *Attorney, Agent, or Firm* — Kilyk & Bowersox, P.L.L.C.

(57) ABSTRACT

A shoulder harness for a portable work machine comprises a back member that is to be located on a back of an operator, said back member including a main frame, to which a downward extension frame connected with a waist belt is detachably attached; right and left shoulder belts that respectively extend from right and left upper end portions of said back member; a joint buckle that is to be located on a chest of said operator, distal ends of said right and left shoulder belts being connected to said joint buckle; a hip pad that is to be located on a side of a waist of said operator, and is provided with a locking device, to which a work machine is connected; a relay member that is located above said locking device, and is connected to said locking device by a hanging member; a rear suspension belt that is connected to said relay member and said back member; and a front suspension belt that is connected to said relay member and said joint buckle.

10 Claims, 16 Drawing Sheets

SHOULDER HARNESS FOR PORTABLE WORK MACHINE

CROSS-REFERENCE TO RELATED APPLICATIONS

The present application claims priority from Japanese Patent Application No. 2013-171630, filed on Aug. 21, 2013, which is incorporated herein by reference.

FIELD OF THE INVENTION

The present invention relates to a shoulder harness for supporting a portable work machine, such as a brush cutter and a tree pruner for cutting branches.

BACKGROUND OF THE INVENTION

Since portable work machines are carried by operators during work, the arms of the operator are strained. To reduce the strain, shoulder harnesses are used. Shoulder harnesses have a structure in which the upper body of an operator is surrounded by a harness network including at least a back member that is positioned on the back of the operator, and right and left shoulder belts that are connected to the back member.

FIG. 14 shows the outline of a shoulder harness disclosed in International Publication No. WO2008/076010 A1. A conventional first shoulder harness 1 shown in FIG. 14 includes an armpit belt 11 that is connected to a back member 2. A front end of the armpit belt 11 is joined with right and left shoulder belts SB on the front of an operator, to thereby constitute a harness network 4. A locking device 8, such as a hook, provided with a hip pad 5 is connected to the harness network 4. A work machine (not shown) is detachably attached to the locking device 8. To be more specific, a tunnel portion 5a is formed so as to extend laterally in an upper portion of the hip pad 5. One end of a single continuous suspension strap 6 that is inserted through the tunnel portion 5a is connected to the back member 2, and the other end thereof is connected to a chest plate of an operator. The hip pad 5 is also connected to the back member 2 by a suspension belt 7 as a second suspension member.

FIG. 15 shows the outline of a shoulder harness disclosed in U.S. Pat. No. 5,913,464. A harness network 13 of a conventional second shoulder harness 10 shown in FIG. 15 includes a first slant belt 11A that is connected to an upper end portion of the back member 2 and extends at a slant. The first slant belt 11A extends to the front of an operator at a slant downwardly along the left armpit of the operator from the upper end portion of the back member 2, and is joined with a waist belt 12. Therefore, the first slant belt 11A substantially constitutes an armpit belt. The waist belt 12 includes an extension portion 12a that is extended to the right side of an operator across the back member 2. A distal end of the extension portion 12a is connected to a second slant belt 11B that extends at a slant from the upper end portion of the back member 2. The locking device 8 provided with the hip pad 5 is connected to the harness network 13 via front and rear suspension belts 14 and 15. To be more specific, the front suspension belt 14 is connected to a joint portion between the first slant belt 11A and the waist belt 12, and the rear suspension belt 15 is connected to a joint portion between the extension portion 12a of the waist belt 12 and the shoulder belt SB.

FIG. 16 shows the outline of a shoulder harness disclosed in U.S. Pat. No. 6,247,624 B1 and International Publication No. WO2008/147256 A1. A conventional third shoulder harness 20 shown in FIG. 16 includes the armpit belt 11 and a waist belt 3 connected to the back member 2 to constitute a harness network 21. The locking device 8 provided with the hip pad 5 is connected to the harness network 21 via the front and rear suspension belts 14 and 15. To be more specific, the front suspension belt 14 is connected to the front end of the armpit belt 11, and the rear suspension belt 15 is connected to the back member 2. In FIG. 16, reference numeral 16 denotes a joint buckle that can be combined and separated. The joint buckle 16 is to be positioned on the chest of an operator.

FIG. 17 shows the outline of a shoulder harness disclosed in Japanese Patent Laid-Open No. 2005-143453. A conventional fourth shoulder harness 30 shown in FIG. 17 includes right and left armpit belts 31 and 32 connected to the back member 2 to constitute a harness network 33. The hip pad 5 including the locking device 8 is connected to the harness network 33 via the front and rear suspension belts 14 and 15. To be more specific, the front suspension belt 14 is connected to a front end of the left armpit belt 31, and the rear suspension belt 15 is connected to the back member 2.

SUMMARY OF THE INVENTION

Problems to be Solved by the Invention

As is understood from the conventional shoulder harnesses of various types described above, the configuration in which the locking device (the hip pad) is connected to the harness network by use of the plurality of suspension belts or suspension straps is employed in the conventional shoulder harnesses. Accordingly, even when a work machine attached to the locking device is moved rightward or leftward, the locking device can move moderately along with the movement of the work machine. The load of the work machine can be thereby dispersed over the upper body of an operator without affecting the working capacity of the operator. However, since the configuration in which the locking device (the hip pad) is connected to the harness network via the plurality of suspension belts or straps is employed in the conventional shoulder harnesses, the following problem occurs.

When the movement of the work machine is within a predetermined range, the locking device (the hip pad) can move with moderate looseness left in the suspension belts or the suspension straps. However, when the work machine is largely moved, the locking device also moves largely along with the movement, thereby bringing one of the front and rear suspension belts or straps into a pulled state. A portion of the harness network is thereby affected, and as a result, a locally concentrated tensile force is applied to the upper body of an operator. Since a portion to which the concentrated tensile force is applied, and the magnitude of the tensile force change every moment, the tensile force causes accumulation of fatigue in an operator who uses the work machine while enduring the locally concentrated tensile force.

An object of the present invention is to provide a shoulder harness for a portable work machine, which can reduce the fatigue of an operator by reducing local application, to a harness network, of a tensile force generated by displacement of a locking device, to which a work machine is attached, while allowing the displacement of the locking device.

Another object of the present invention is to provide a shoulder harness for a portable work machine, which can be used in different modes for a relatively heavy work machine, and for a relatively light work machine.

Yet another object of the present invention is to provide a shoulder harness for a portable work machine, which can reduce the occurrence of local deformation on a harness network by a tensile force generated by displacement of a locking device, to which a work machine is attached, while allowing the displacement of the locking device.

Means for Solution of the Problems

According to the present invention, the above technical objects can be achieved by providing a shoulder harness (100) for a portable work machine including:

a back member (102) that is to be located on a back of an operator, the back member (102) including a main frame (140), to which a downward extension frame (142) connected with a waist belt (132) is detachably attached;

right and left shoulder belts (104R, 104L) that respectively extend from right and left upper end portions of the back member(102);

a joint buckle (108) that is to be located on a chest of the operator, distal ends of the right and left shoulder belts (104R, 104L) being connected to the joint buckle (108);

a hip pad (116) that is to be located on a side of a waist of the operator, and is provided with a locking device (114), to which a work machine is connected;

a relay member (120) that is located above the locking device (114), and is connected to the locking device (114) by a hanging member (122);

a rear suspension belt (126) that is connected to the relay member (120) and the back member (102); and a front suspension belt (124) that is connected to the relay member (120) and the joint buckle (108).

In accordance with the present invention, a harness network includes at least the back member (102) and the right and left shoulder belts (104R, 104L). In a preferred embodiment, the harness network further includes an armpit belt (106) that is connected to the joint buckle (108). The locking device (114) is connected to the harness network via the relay member (120). Because of the configuration, that is, the configuration in which the relay member (120) is interposed between the locking device (114), to which the work machine is locked, and the harness network, it is possible to reduce local application of a tensile force generated by displacement of the locking device (114) to the harness network while allowing the displacement of the locking device (114).

In the shoulder harness (100) of the present invention, the back member (102) includes the main frame (140), and the downward extension frame (142), to which the waist belt (132) is connected, can be detachably attached to the main frame (140). By attaching the downward extension frame (142) to the main frame (140), a shoulder harness suited to a relatively heavy work machine can be configured. In other words, in a mode without the downward extension frame (142), a shoulder harness suited to a relatively light work machine can be configured.

As means for attaching and detaching the downward extension frame (142) to and from the main frame (140), fastening means such as a bolt and a nut may be employed. However, it is preferable to employ a mechanism in which shape portions respectively formed in the main frame (140) and the downward extension frame (142) are engaged with and disengaged from each other. It is more preferable to employ a mechanism in which the engagement and the disengagement can be performed without using a tool.

Other objects, operations and advantages of the present invention will become apparent from the following detailed description of the preferred embodiment.

DETAILED DESCRIPTION OF THE PRESENT INVENTION

Embodiment

In the following, a preferred embodiment of the present invention is described based on the accompanying drawings. In the description of the embodiment, a case in which a shoulder harness of the embodiment is located on the left side of an operator when the operator wears the shoulder harness is referred to as "left", and a case in which the shoulder harness is located on the right side of the operator is referred to as "right". As to the terms "front" and "rear", a case in which the shoulder harness is located on the front side of an operator when the operator wears the shoulder harness is referred to as "front", and a case in which the shoulder harness is located on the rear side of the operator is referred to as "rear".

Figure 1:
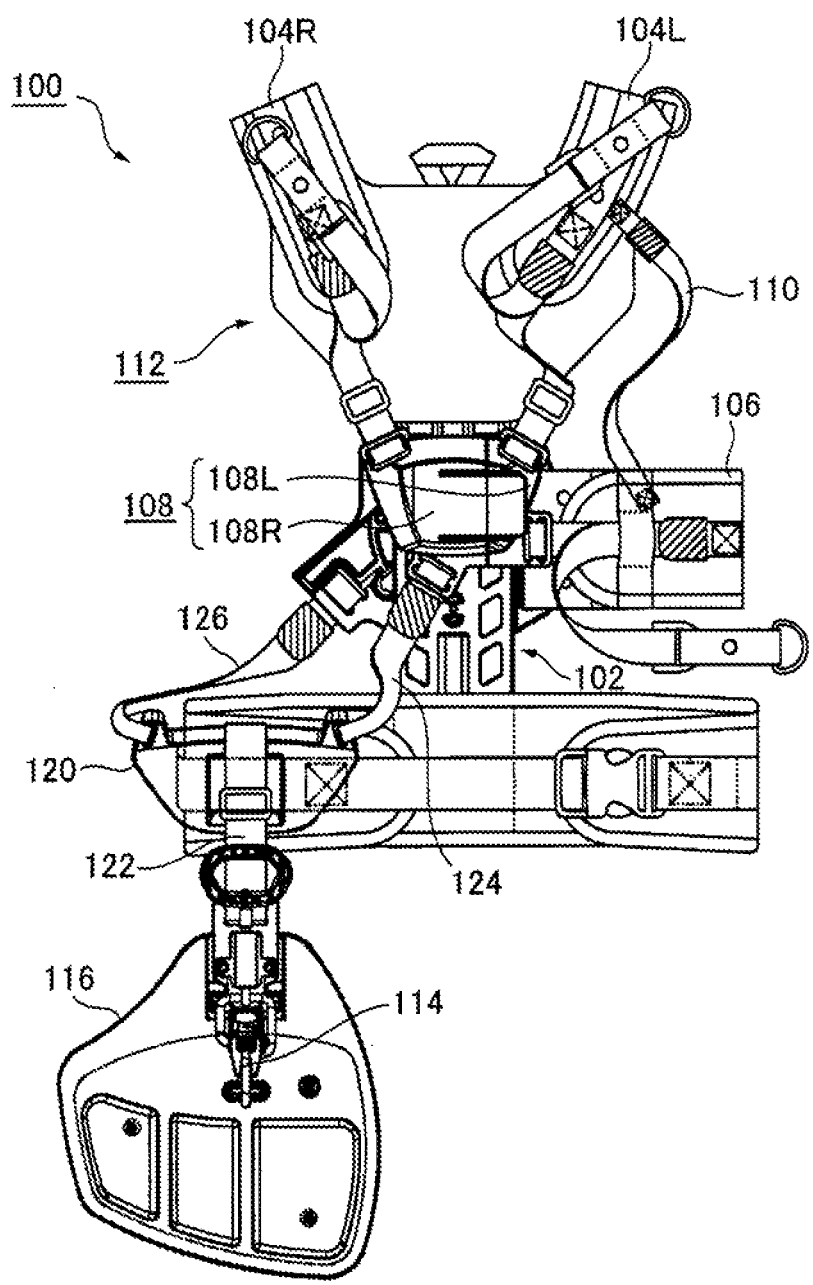
FIG. 1 shows a front diagram of a shoulder harness according to an embodiment, in which a full mode for using a relatively heavy work machine is shown.
Figure 2:
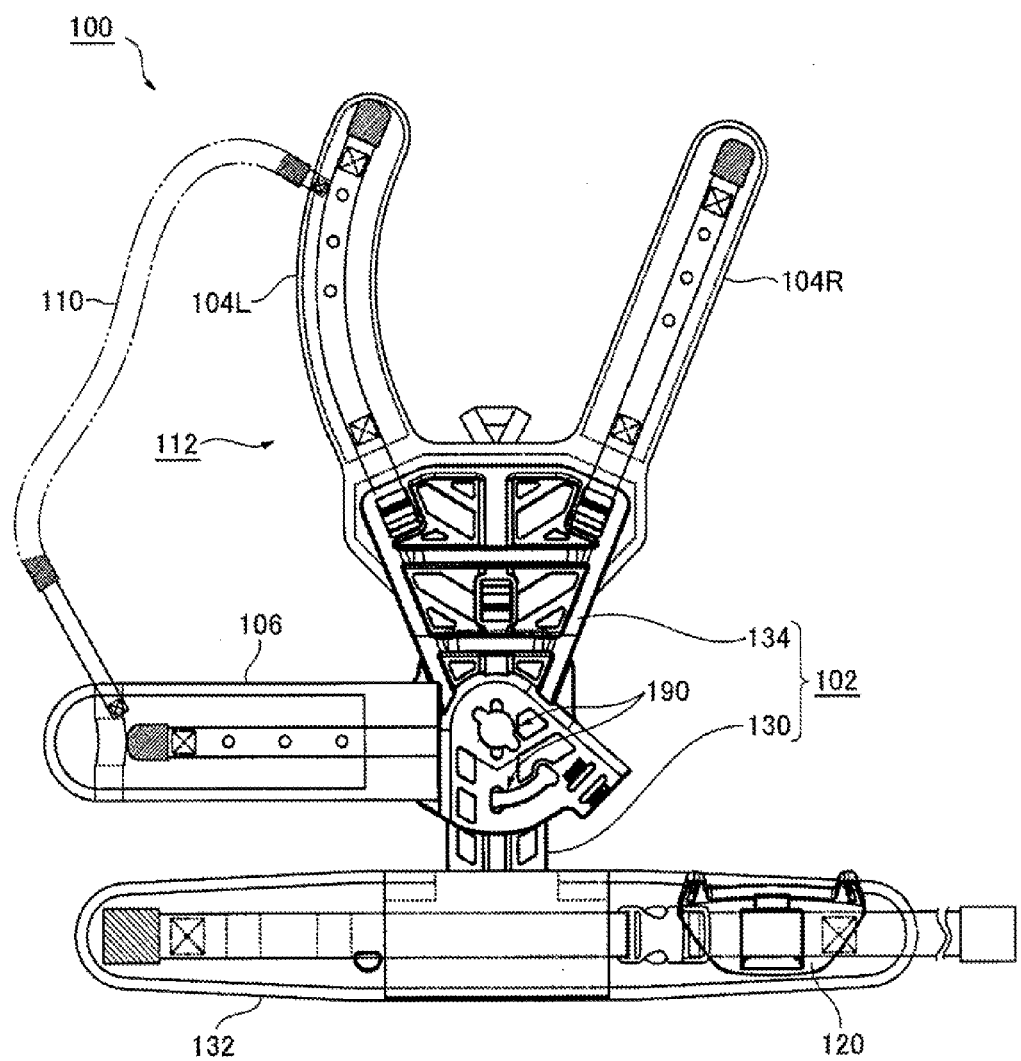
FIG. 2 shows a rear diagram of the shoulder harness shown in FIG. 1, in which a hip pad included in the shoulder harness is not shown.

FIG. 1 shows a front diagram of a shoulder harness 100 of the embodiment as viewed from the front side. FIG. 2 shows a rear diagram of the shoulder harness 100. The shoulder harness 100 basically includes a back member 102 that is to be located on the back of an operator, and right and left shoulder belts 104 that are to be located on the front of an operator by extending along the right and left shoulders of the operator from the back member 102. The left-side shoulder belt is assigned reference character "L". The right-side shoulder belt is assigned reference character "R".

The shoulder harness 100 includes an armpit belt 106 that extends laterally along the armpit, preferably, on the left side of an operator. Distal ends of the right and left shoulder belts 104R and 104L, and the armpit belt 106 are connected to a joint buckle 108, and thereby joined on the chest of an operator (FIG. 1).

The joint buckle 108 includes a left buckle element 108L and a right buckle element 108R, which can be separated from each other, similarly to a conventional buckle. The distal ends of the left shoulder belt 104L and the armpit belt 106 are connected to the left buckle element 108L. The distal end of the right shoulder belt 104R is connected to the right buckle element 108R.

As a preferable form, a distal end portion of the left shoulder belt 104L and a distal end portion of the armpit belt 106 may be connected by an auxiliary belt 110 although the auxiliary belt 110 may not be provided.

The above configuration is the configuration of a harness network 112 of the shoulder harness 100 of the embodiment. Although the harness network 112 includes the armpit belt 106 as described above, the armpit belt 106 is not essential. The network without the armpit belt 106 may be also employed. An operator can wear the shoulder harness 100 by combining the right and left buckle elements 108R and 108L. On the other hand, an operator can remove the shoulder harness 100 from his/her body by separating the right and left buckle elements 108R and 108L from each other.

By reference to FIG. 1, the shoulder harness 100 includes a hip pad 116 that is provided with a locking device 114. The hip pad 116 is to be located on the right side of the waist of an operator. That is, while the armpit belt 106 is to be located on the left side of an operator, the hip pad 116 is to be located on the right side opposite to the armpit belt 106.

The locking device 114 is composed of a hook. For example, a brush cutter (not shown) is connected to the locking device 114 as in a conventional case. The hip pad 116 (the locking device 114) is connected to the harness network 112 via a relay member 120. Note that the hip pad 116 is not shown in FIG. 2.

By continuous reference to FIG. 1, the relay member 120 is composed of a plate member. The locking device 114 (the hip pad 116) hangs from the relay member 120 via a hanging member 122 such as a single wide belt or strap. The relay member 120 may be connected to the harness network 112 by two front and rear suspension belts 124 and 126. The front and rear suspension belts 124 and 126 may also be composed of a single continuous belt. To be more specific, an upper end of the front suspension belt 124 is connected to the right buckle element 108R. On the other hand, an upper end of the rear suspension belt 126 is connected to the back member 102. Although the single hanging member 122 is employed in the embodiment, a plurality of hanging members may also be employed.

As described above, in the shoulder harness 100, the relay member 120 is interposed between the harness network 112 and the locking device 114 (the hip pad 116). The existence of the relay member 120 can reduce local application of the load of a portable work machine, which is attached to the locking device 114, to the harness network 112. Also, since the hip pad 116 can swing relatively freely like a pendulum along with the movement of the work machine, local application of a tensile force generated by the swing of the locking device 114 to the harness network 112 can be suppressed. It goes without saying that the above advantages obtained by the relay member 120 being interposed between the locking device 114 and the harness network 112 contributes to a reduction in the fatigue of an operator.

The advantages obtained by the existence of the relay member 120 can also be described as follows. Since the shoulder harness 100 has a structure in which the relay member 120 is substantially incorporated in the harness network 112, a static load or a dynamic load applied to the relay member 120 when the work machine (not shown) is largely moved can be effectively dispersed over the harness network 112. The local application of the tensile force to the harness network 112 can also be suppressed. Moreover, the locking device 114 (the hip pad 116) hanging from the relay member 120 is supported by the relay member 120 located in the vicinity thereof and can thereby swing freely. Thus, when the work machine is moved within a range in which the relay member 120 is maintained in a stable state, the movement of the locking device 114 (the hip pad 116) along with the movement of the work machine does not directly affect the harness network 112. This means that it is possible to prevent application of a locally concentrated tensile force to the upper body of an operator every time the work machine is moved. This also means that it is possible to reduce momentary changes in a portion of the harness network 112, to which the tensile force is applied, and the magnitude of the tensile force during work.

As shown in FIG. 2, the back member 102 includes an extension portion 130 that extends downward. A waist belt 132 is connected to the extension portion 130. The relay member 120 described above is connected to the waist belt 132. Although the extension portion 130 of the back member 102 may be integrated with a main portion 134 that is located above the extension portion 130, preferably the main portion 134 and the extension portion 130 may be configured separably as described below.

When the main portion 134 and the extension portion 130 separable from each other constitute the back member 102, the back member 102 can be used differently in two modes of a simple mode without the extension portion 130, and a full mode with the extension portion 130. The back member 102 with the extension portion 130 constitutes the shoulder harness 100 in the full mode (with the waist belt 132), which is suited to a case in which a relatively heavy work machine is used. On the other hand, the back member 102 without the extension portion 130 constitutes the shoulder harness 100 in the simple mode (without the waist belt 132), which is suited to a case in which a relatively light work machine is used.

Figure 3:
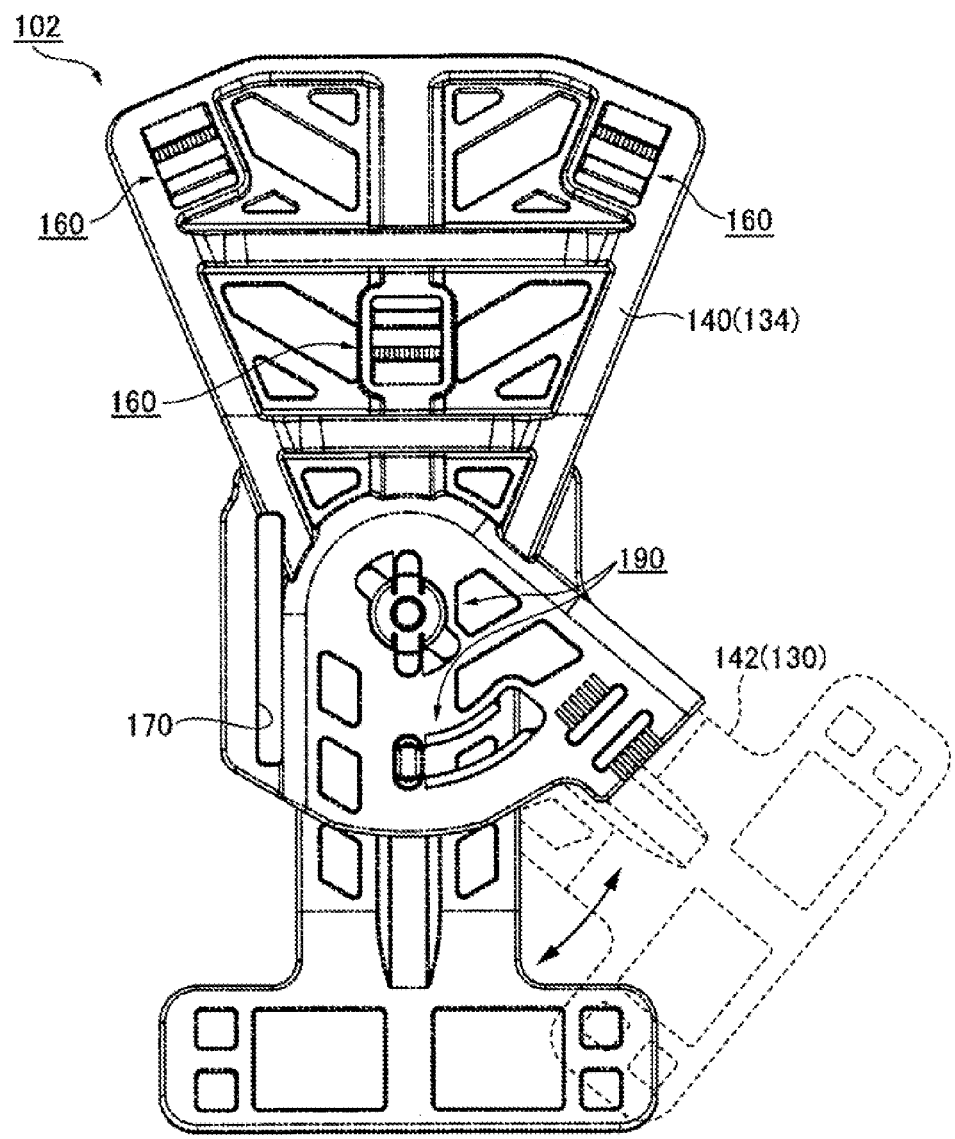
FIG. 3 shows a rear diagram of a back member having a divided structure, included in the shoulder harness of the embodiment.

Respective parts constituting the shoulder harness 100 are described below by reference to the accompanying drawings. FIG. 3 shows a rear diagram of the back member 102. The back member 102 includes a main frame 140 that constitutes the main portion 134 described above, and a downward extension frame 142 that constitutes the extension portion 130 described above. The downward extension frame 142 is attachable to and detachable from the main frame 140. The main frame 140 and the downward extension frame 142 are moldings of synthetic resin such as PE, PP, and nylon.

Figure 4:
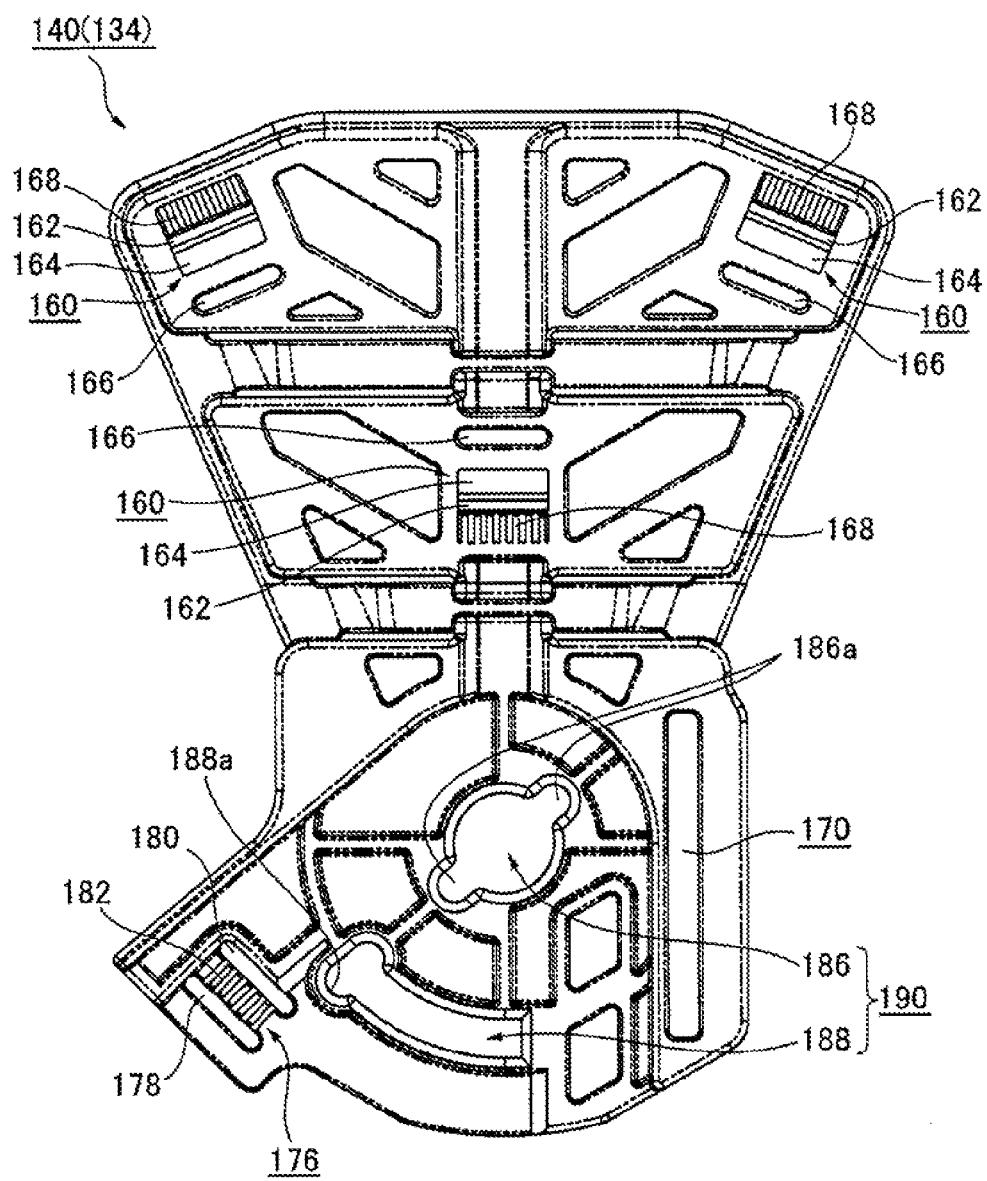
FIG. 4 shows a front diagram of a main frame of the back member.
Figure 5:
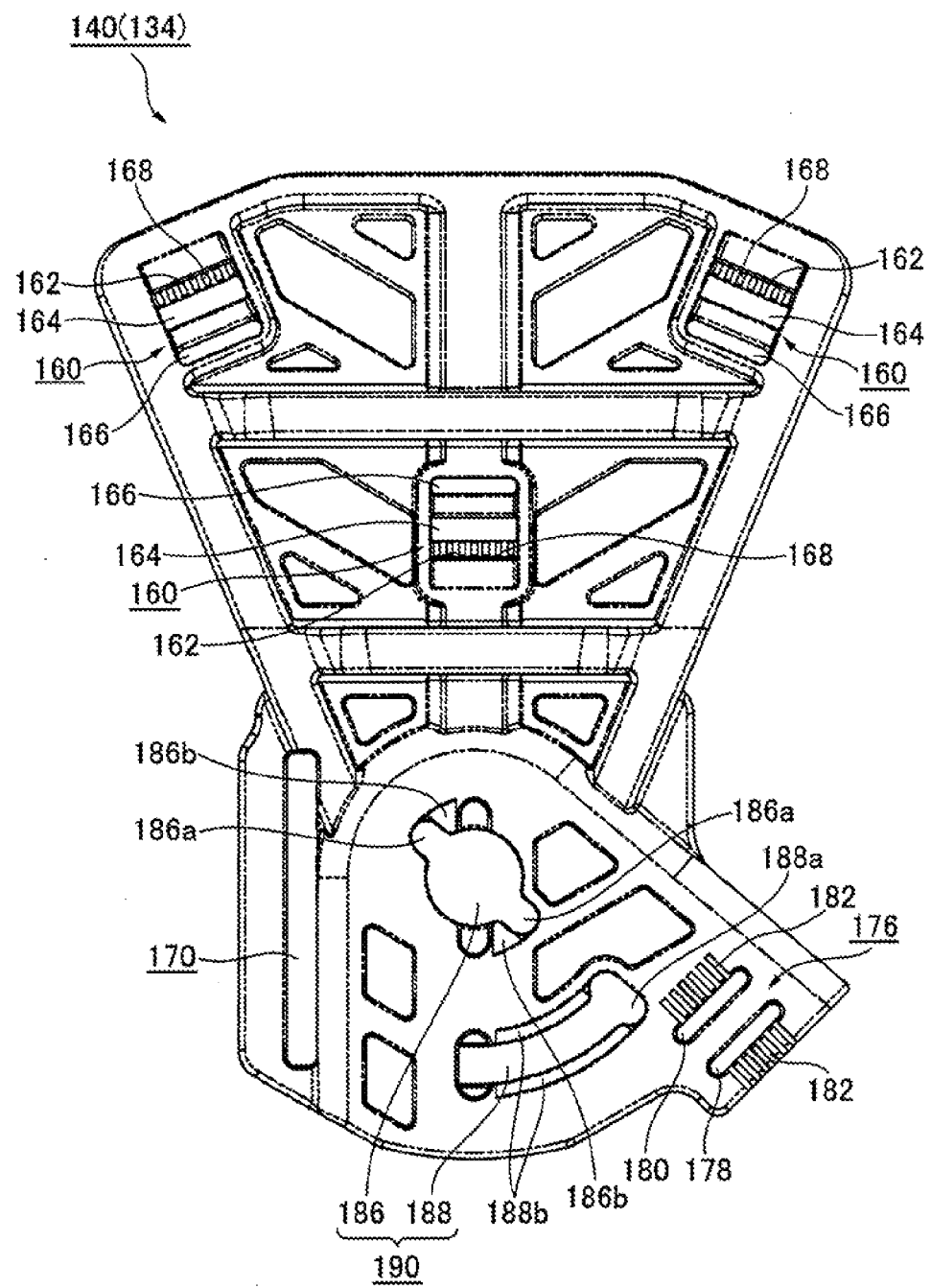
FIG. 5 shows a rear diagram of the main frame shown in FIG. 4.

FIGS. 4 and 5 show the main frame 140. FIG. 4 shows a front diagram of the main frame 140. FIG. 5 shows a rear diagram of the main frame 140. A back pad assembly 146 shown in FIG. 6 is arranged on a front surface of the main frame 140.

The back pad assembly 146 is described first for convenience of description. FIG. 6 shows a rear diagram of the back pad assembly 146. The back pad assembly 146 includes a back pad cushion 148 that is mainly formed from a cushion pad. The back pad cushion 148 includes a back pad body 150 that is to be located on the back of an operator, and the right and left shoulder belts 104R and 104L that extend from right and left upper ends of the back pad body 150. Band-like shoulder straps 152L and 152R, made of high-density fiber (such as polyester fiber or nylon fiber), are sewed on the left shoulder belt 104L and the right shoulder belt 104R. A center strap 154 is also sewed on a center portion of the back pad body 150.

Figure 6:
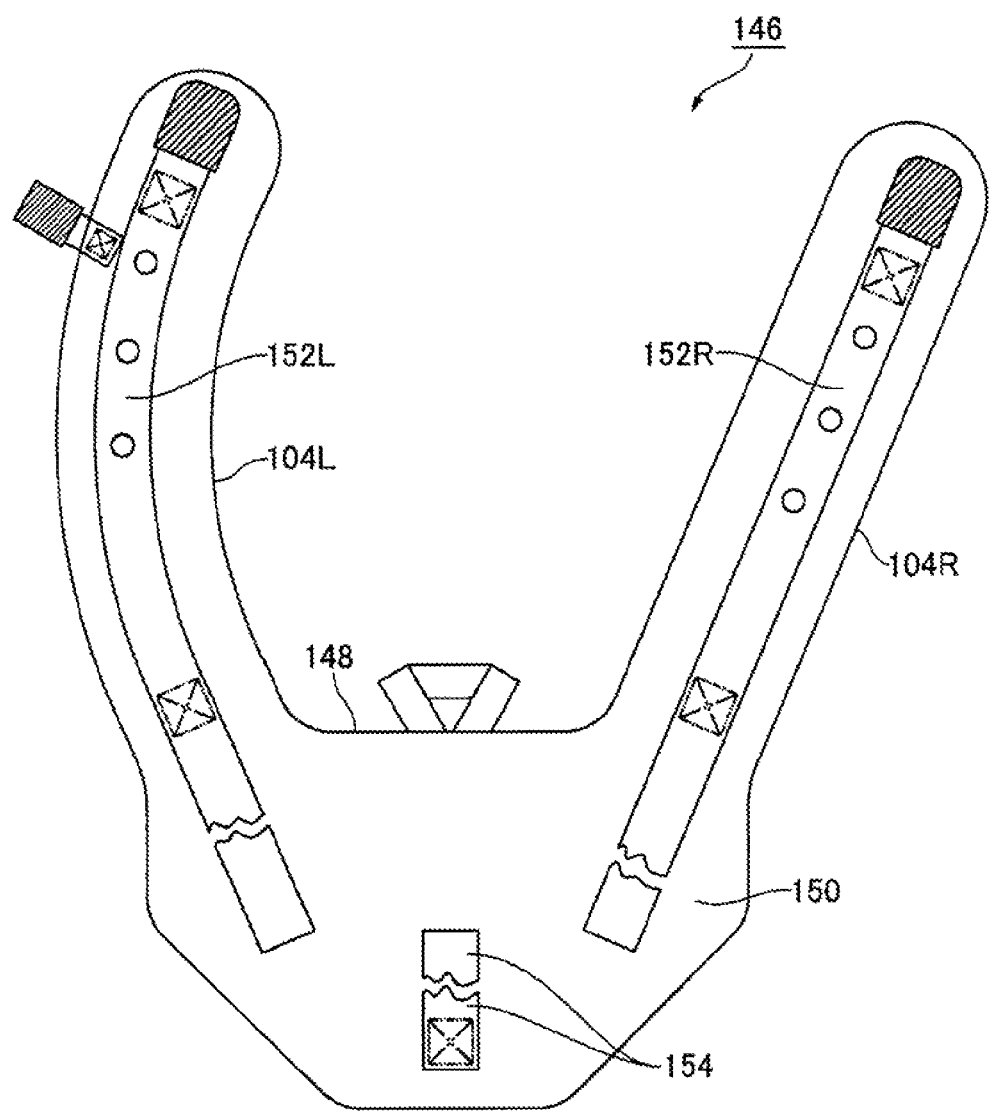
FIG. 6 shows a rear diagram of a back pad assembly included in the shoulder harness of the embodiment.

A person skilled in the art would immediately recognize that the right and left shoulder belts 104R and 104L are asymmetrical at the sight of the form of the back pad assembly 146 in FIG. 6.

To be more specific, while the right shoulder belt 104R has a straight band-like form, the left shoulder belt 104L has a band-like form curved to the inner side, i.e., the right side. That is, the left shoulder belt 104L has a curved shape gradually displaced to the inner side, i.e., the right side while extending to the front of an operator along the shoulder from the back of the operator. Moreover, a front end portion of the left shoulder belt 104L has a slightly curved shape gradually displaced toward the joint buckle 108 (FIG. 1, to be located on the center of the chest of an operator). In other words, the left shoulder belt 104L has a shape curved to the right side over a region from the portion extending to the front of an operator along the left shoulder from the back of the operator to the distal end portion. Accordingly, the left shoulder belt 104L is naturally directed toward the joint buckle 108 because of the curved shape.

By reference to FIG. 1, the locking device 114 (the hip pad 116), to which the work machine is locked, is to be located on the right side of the waist of an operator. Therefore, a larger load is applied to the left shoulder belt 104L than the right shoulder belt 104R from the work machine. The tensile force generated when the work machine is largely moved also inevitably tends to be applied to the left shoulder belt 104L. A portion of the left shoulder belt 104L located from the left shoulder to the front of an operator is previously formed in a curved shape so as to correspond to a direction in which the tensile force is applied. Accordingly, even when the tensile force is applied to the left shoulder belt 104L, the position and the shape of a portion of the left shoulder belt 104L in contact with the shoulder of an operator are not changed by the applied tensile force. Thus, even when a large tensile force is applied to the left shoulder belt 104L, a good fit in the left shoulder portion of an operator can be maintained. Even if a large tensile force is applied to the left shoulder belt 104L, deformation, such as twist, does not occur on the left shoulder belt 104L in the left shoulder portion of an operator. Therefore, the durability of the left shoulder belt 104L can be improved.

The distal end portion of the left shoulder belt 104L is connected to the armpit belt 106 by the auxiliary belt 110 as described above. Accordingly, displacement of the distal end portion of the left shoulder belt 104L to the right side due to the load from the work machine can be suppressed by the auxiliary belt 110. Consequently, the occurrence of deformation, such as twist, on the left shoulder belt 104L in the left shoulder portion of an operator can be further suppressed.

The main frame 140 of the back member 102 is to be positioned on the back of an operator. By reference to FIGS. 4 and 5, buckle portions 160 for fixing the back pad assembly 146 are formed at three positions of right and left corner portions at an upper end portion of the main frame 140, and a center portion of the main frame 140. The back pad assembly 146 is fixed to the main frame 140 by using the three buckle portions 160 located at the three vertexes of the inverted triangle. Each of the three buckle portions 160 for the back pad assembly includes first to third slits 162, 164, and 166 for receiving each of the two shoulder straps 152 and the single center strap 154 of the back pad assembly 146. An end portion of the shoulder straps 152 or the center strap 154 is sequentially passed through the first, second, and third slits 162, 164, and 166 located apart from each other. The back pad assembly 146 is thereby fixed. Of course, the length of the shoulder straps 152 or the center strap 154 can be adjusted. Preferably a concave-convex anti-slip portion 168 is formed in the vicinity of the first slit 162.

Figure 7:
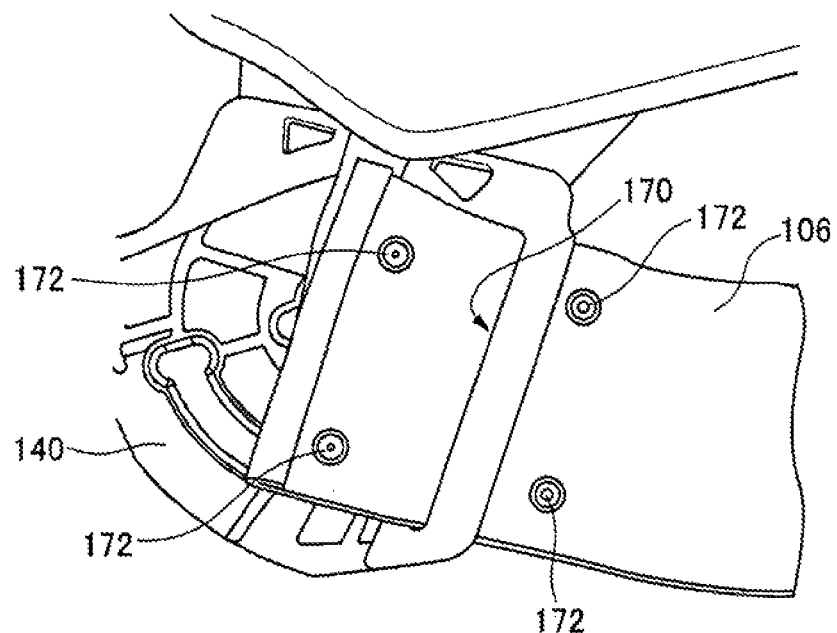
FIG. 7 shows a diagram for explaining a first step of fixing an armpit belt to the main frame.
Figure 8:
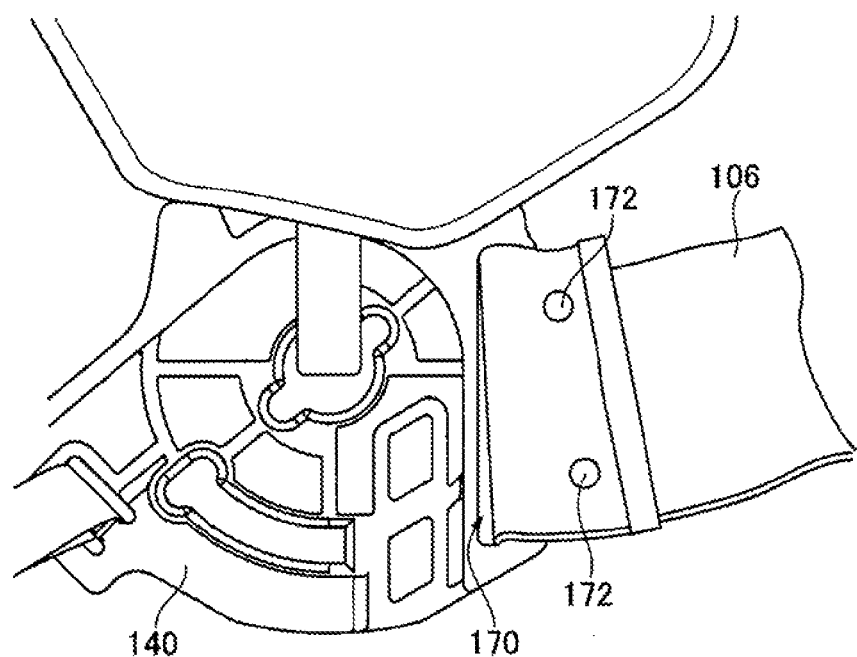
FIG. 8 shows a diagram for explaining a second step (a final step) of fixing the armpit belt to the main frame.

The main frame 140 includes one longitudinal slit 170 that extends vertically at a left side edge in a lower portion of the main frame 140. An end of the armpit belt 106 is fixed by using the longitudinal slit 170. By reference to FIGS. 7 and 8, two pairs of snap fitting hooks, that is, snap fasteners 172 and 172 are attached to an end portion of the armpit belt 106 so as to vertically apart from each other. The end portion of the armpit belt 106 is fixed to the main frame 140 as described below. First, the end portion of the armpit belt 106 is passed through the longitudinal slit 170 (FIG. 7). Subsequently, the end portion of the armpit belt 106 is folded back so as to lock the two pairs of snap fasteners 172 and 172 together (FIG. 8). As a modification, a hook and loop fastener may be employed instead of the snap fastener 172.

A buckle portion 176 for fixing an upper end portion of the rear suspension belt 126 is formed on the right side of a lower end portion of the main frame 140. The buckle portion 176 is formed in a portion projecting in a lower right direction from the lower end portion of the main frame 140. The buckle portion 176 includes first and second slits 178 and 180 that are located apart from each other. A concave-convex anti-slip portion 182 is formed in the vicinity of the slits 178 and 180. A method of fixing the rear suspension belt 126 (FIG. 1) to the buckle portion 176 is substantially the same as that of the shoulder straps 152 and the center strap 154 described above.

Although the rear suspension belt 126 and the front suspension belt 124 connected to the right buckle element 108R may be composed of separate belts, the front and rear suspension belts 124 and 126 may also be composed of a single continuous belt as described above.

The main frame 140 includes, in the lower end portion thereof, an upper opening 186 and a lower opening 188 that are vertically apart from each other. The upper and lower openings 186 and 188 constitute a connecting portion 190 for connecting the downward extension frame 142 to the main frame 140. The upper opening 186 has a substantially circular shape. On the other hand, the lower opening 188 has an elongated shape, and extends in an arc shape. The center of the arc shape of the lower opening 188 is aligned with the center of the upper opening 186.

As is understood from FIGS. 4 and 5, a first enlarged portion 188a is formed at one end of the band-like lower opening 188 that extends in the arc shape. A pair of second enlarged portions 186a that extend in a diameter direction in alignment with the first enlarged portion 188a of the lower opening 188 is formed in the substantially-circular upper opening 186. By reference to FIG. 5, step portions 186b and 188b are formed respectively on edge portions of the upper and lower openings 186 and 188 on the back surface side of the main frame 140. A structure for connecting the downward extension frame 142 using the upper and lower openings 186 and 188 is described below.

Figure 9:
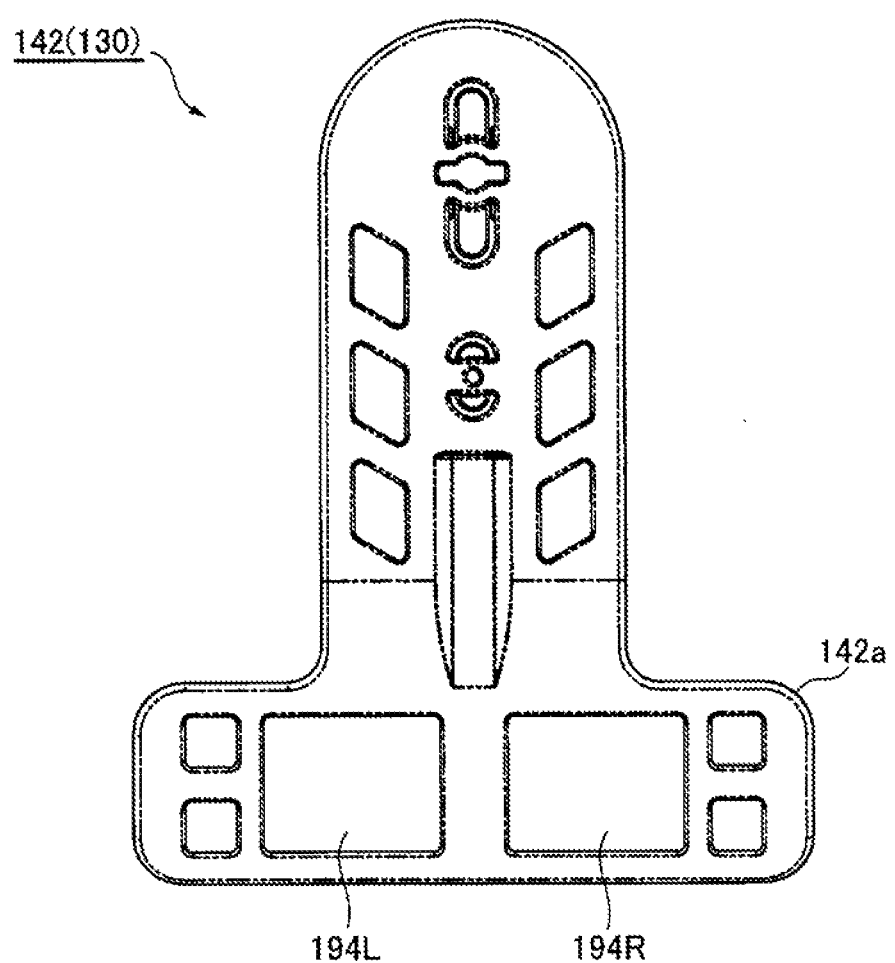
FIG. 9 shows a front diagram of a downward extension frame detachably connected to the main frame.
Figure 10:
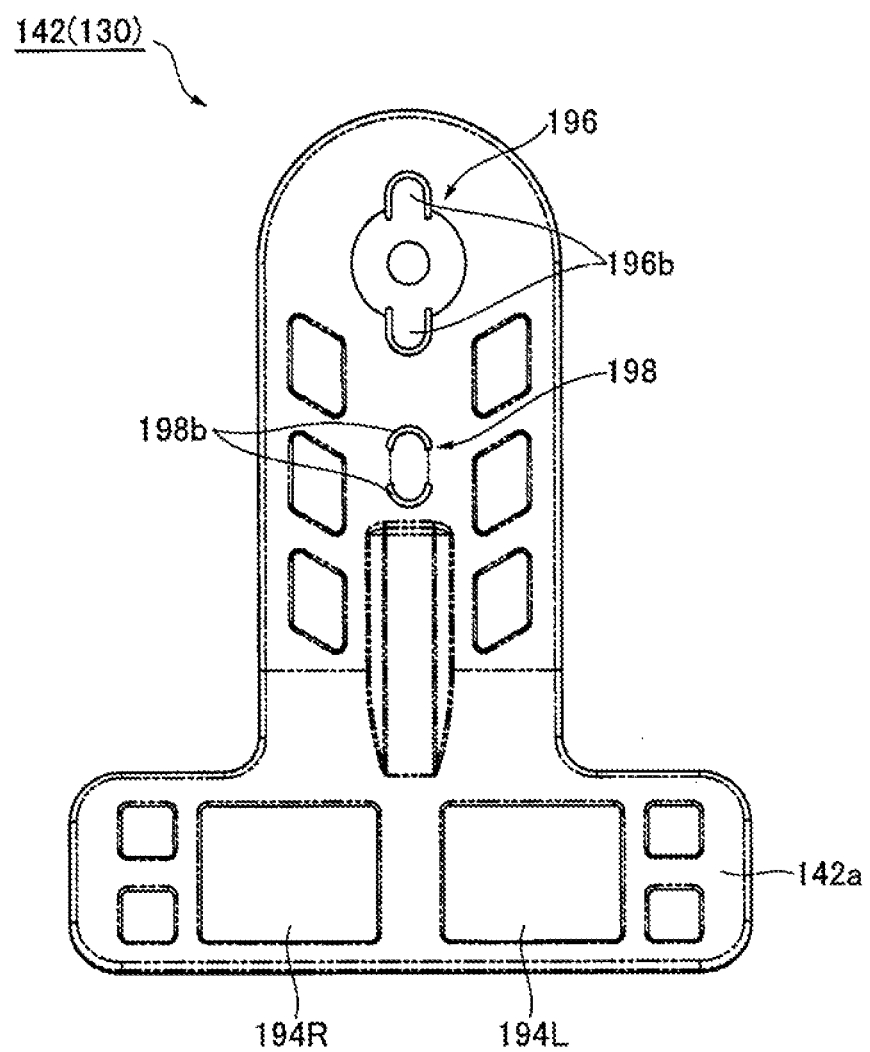
FIG. 10 shows a rear diagram of the downward extension frame shown in FIG. 9.

FIGS. 9 and 10 show the downward extension frame 142. FIG. 9 shows a front diagram. FIG. 10 shows a rear diagram. The downward extension frame 142 has an inverted T shape as viewed in front view. A lower end portion 142a of the downward extension frame 142 extends laterally. Two openings 194L and 194R that are laterally apart from each other are formed in a center portion of the lower end portion 142a. The waist belt 132 is attached to the downward extension frame 142 by passing the waist belt 132 through the right and left openings 194R and 194L (FIGS. 1 and 2).

By reference to FIG. 10, an upper pin 196 and a lower pin 198 are integrally formed in an upper portion of a back surface of the downward extension frame 142. The upper and lower pins 196 and 198 are located corresponding to the upper and lower openings 186 and 188 (FIGS. 4 and 5) of the main frame 140 described above. The upper pin 196 corresponding to the substantially circular first opening 186 includes a circular shaft portion 196a having substantially the same diameter as the upper opening 186, and a pair of projections 196b and 196b formed at an upper end of the circular shaft portion 196a so as to project in a diameter direction.

The lower pin 198 located corresponding to the band-like lower opening 188 that extends in the arc shape includes a shaft portion 198a having substantially the same width as the width of the lower opening 188, and a pair of projections 198b and 198b formed at an upper end of the shaft portion 198a so as to project in a width direction of the lower opening 188.

The downward extension frame 142 can be attached to and detached from the main frame 140 by mutual engagement and disengagement between a first shape portion integrally formed in the main frame 140, i.e., the upper and lower openings 186 and 188, and a second shape portion integrally formed in the downward extension frame 142, i.e., the upper and lower pins 196 and 198, without using a tool, nor a fastener such as a bolt and a nut.

Figure 11:
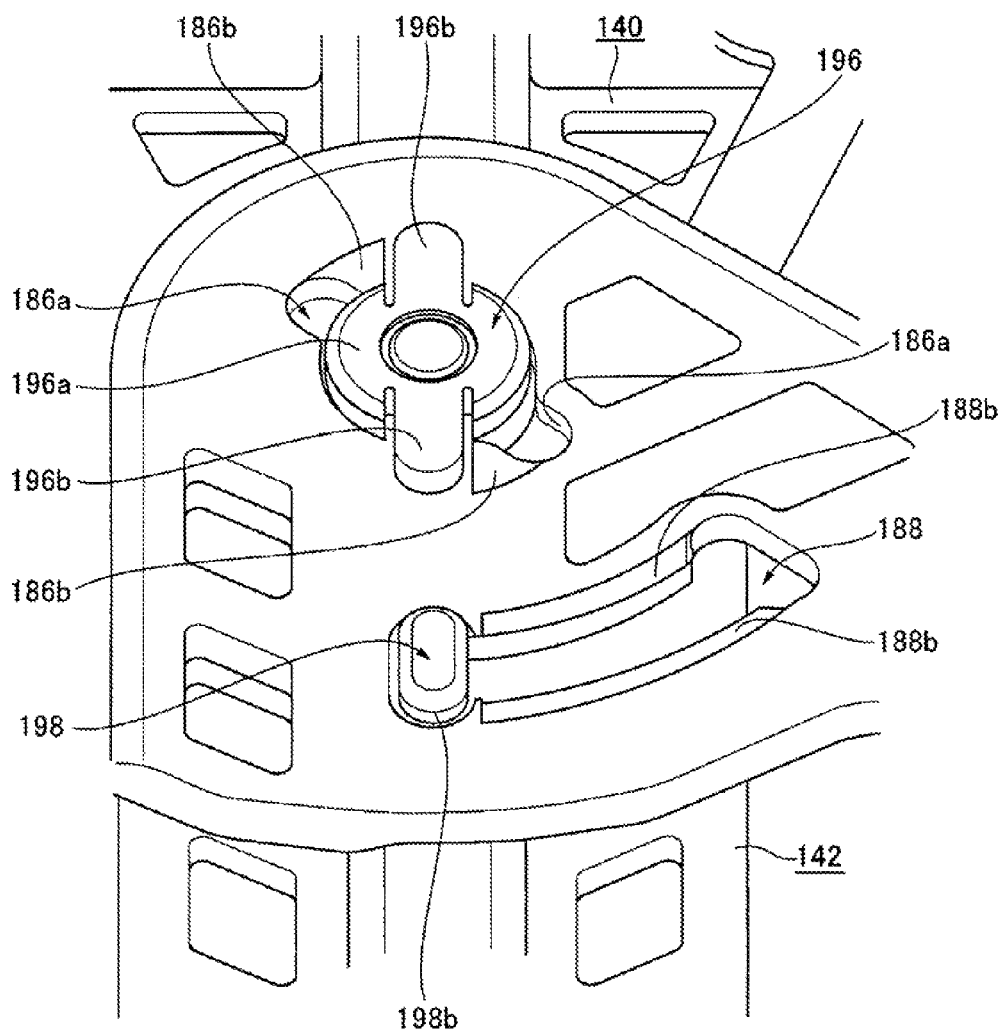
FIG. 11 shows a partial diagram of a connection portion between the main frame and the downward extension frame, in which a state where the downward extension frame is fixed to the main frame is shown.

Particularly in the embodiment, by performing a rotating operation of the downward extension frame 142 with respect to the main frame 140, the downward extension frame 142 can be attached to and detached from the main frame 140. That is, when the downward extension frame 142 is to be connected to the main frame 140, the downward extension frame 142 is located on the front surface of the main frame 140. The upper and lower projections 196b and 198b of the downward extension frame 142 are inserted into the upper and lower openings 186 and 188 of the main frame 140 at an inclined position indicated by a dashed line in FIG. 3, and rotated to a position indicated by a solid line in FIG. 3. As a result, the main frame 140 and the downward extension frame 142 can be integrated together (FIG. 11). The downward extension frame 142 can be removed from the main frame 140 by an opposite rotating operation.

While the rotating operation of the downward extension frame 142 indicated by an arrow in FIG. 3 is being performed, the respective projections 196b and 198b of the upper and lower pins 196 and 198 of the downward extension frame 142 are in friction contact with the step portions 186b and 188b described above.

Figure 12:
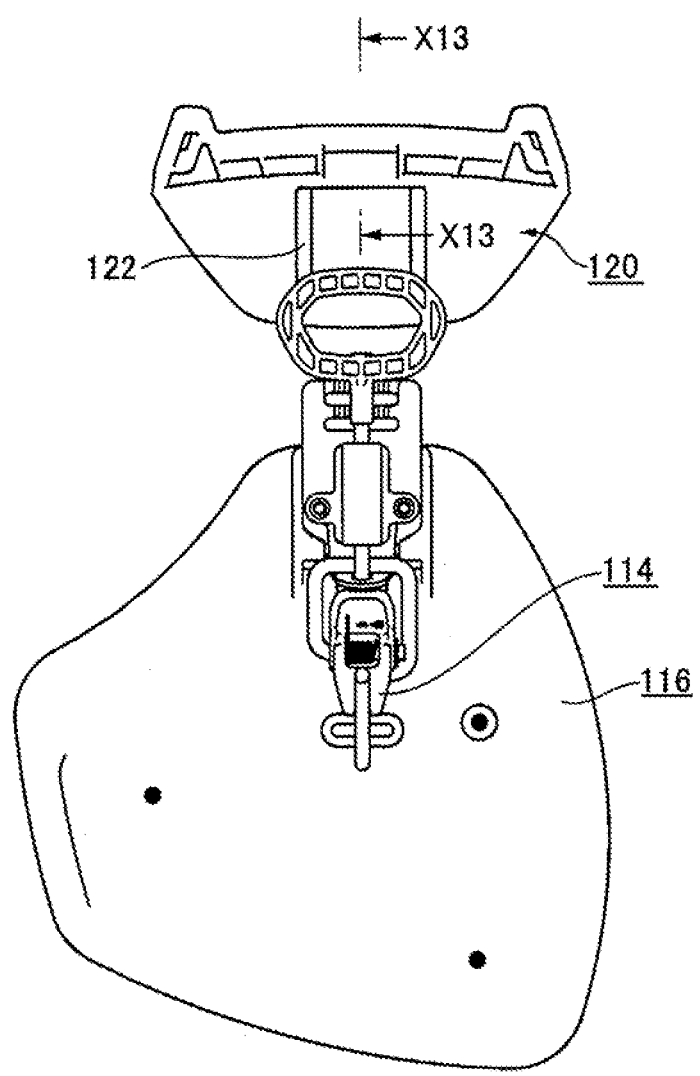
FIG. 12 shows a front diagram of a relay member, and a locking device and a hip pad hanging therefrom.

FIG. 12 shows a front diagram of the relay member 120, the locking device 114 connected thereto by the hanging member 122, and the hip pad 116 where the locking device 114 is installed on an upper end portion. In the embodiment, the hanging member 122 is composed of a band-like belt whose length is adjustable.

Figure 13:
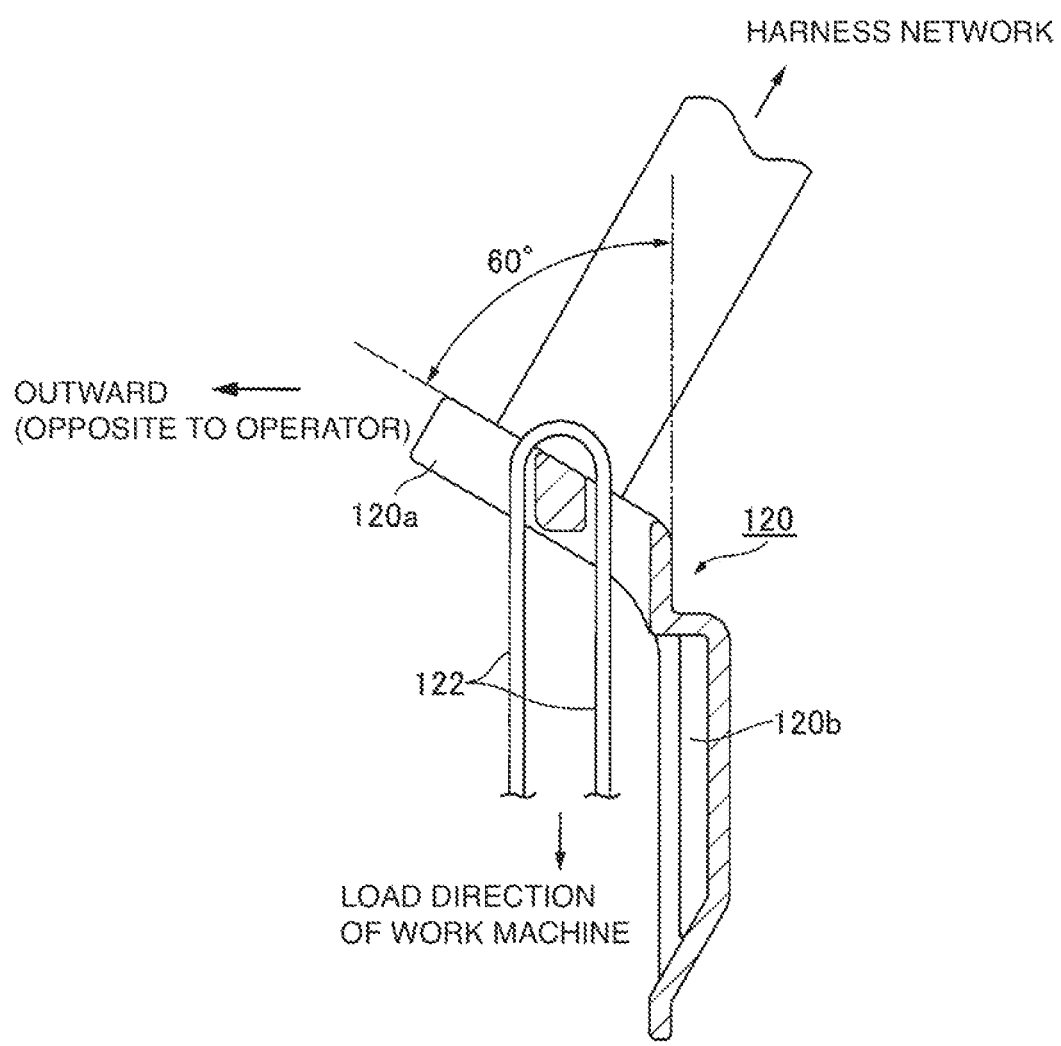
FIG. 13 shows a sectional diagram taken along X13-X13 in FIG. 12.
Figure 14:
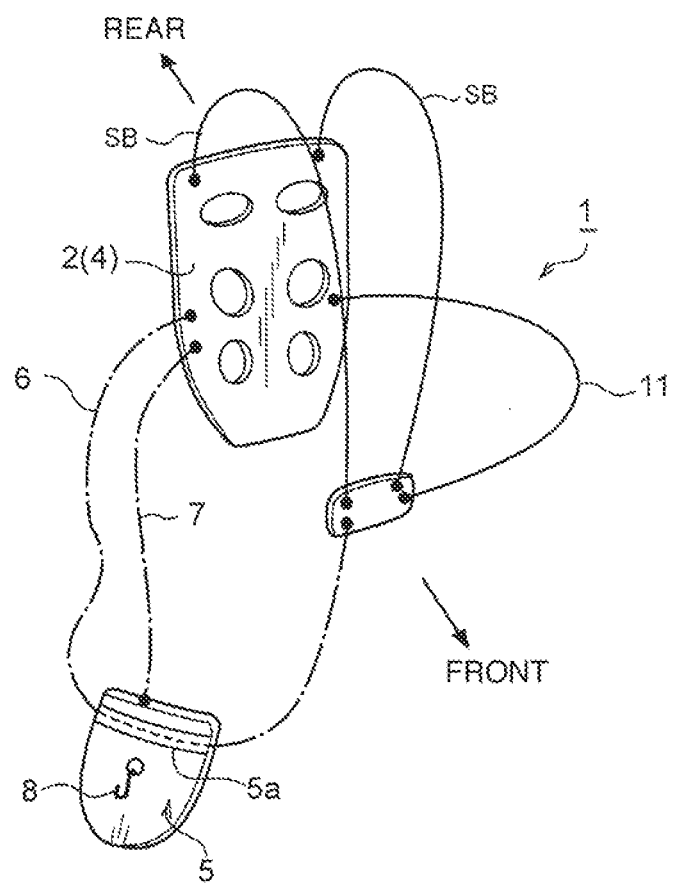
FIG. 14 shows a schematic diagram of a shoulder harness disclosed in International Publication No. WO2008/076010 A1.
Figure 15:
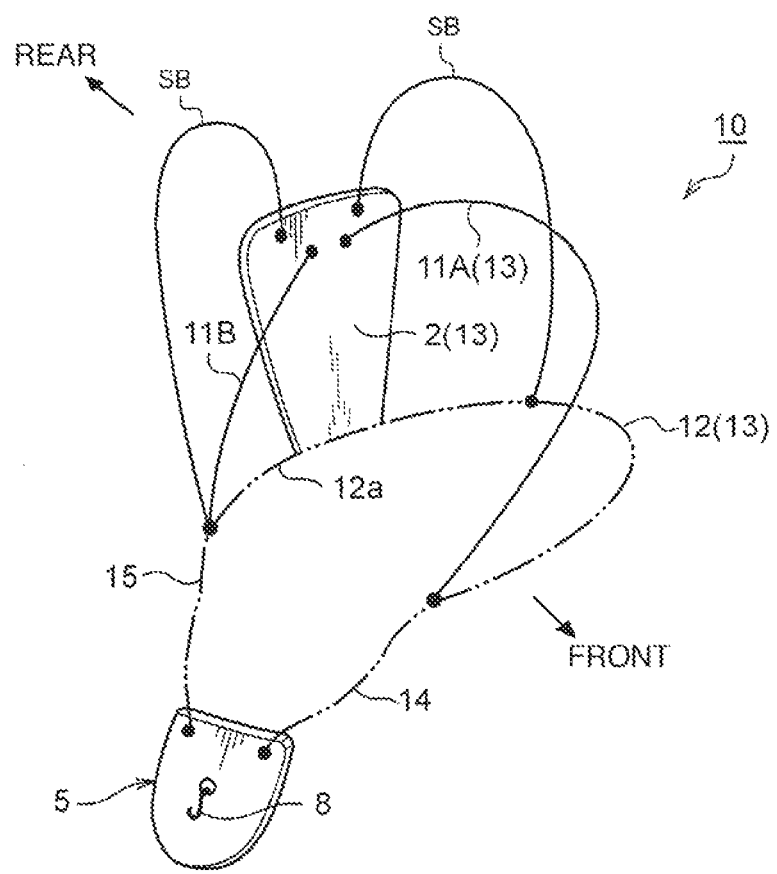
FIG. 15 shows a schematic diagram of a shoulder harness disclosed in U.S. Pat. No. 5,913,464.
Figure 16:
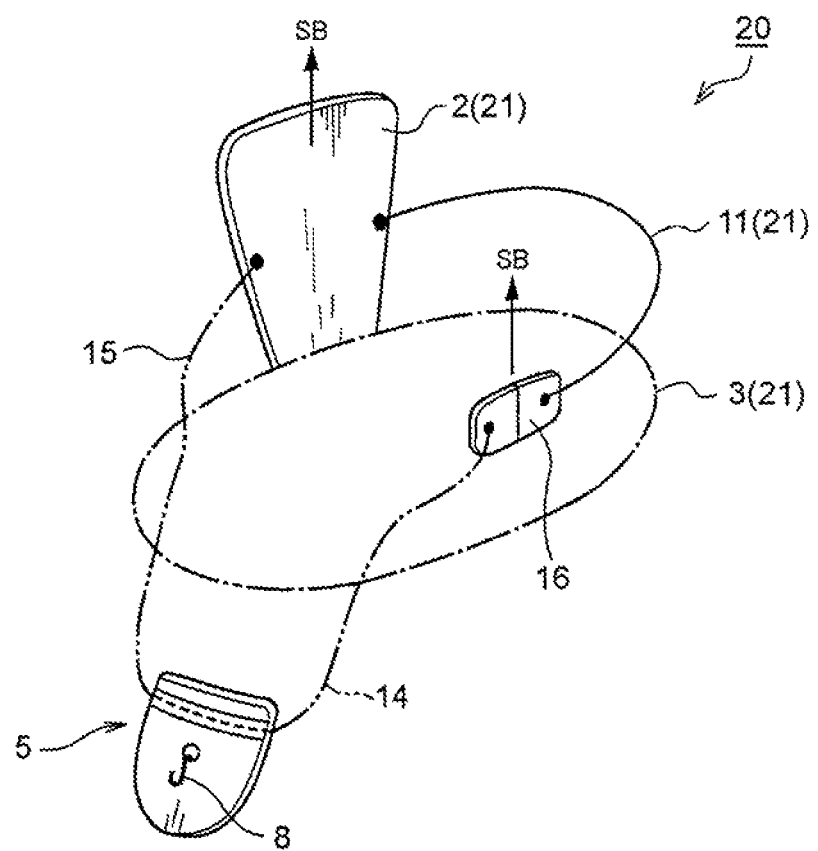
FIG. 16 shows a schematic diagram of a shoulder harness disclosed in U.S. Pat. No. 6,247,624 B1 and International Publication No. WO2008/147256 A1.
Figure 17:
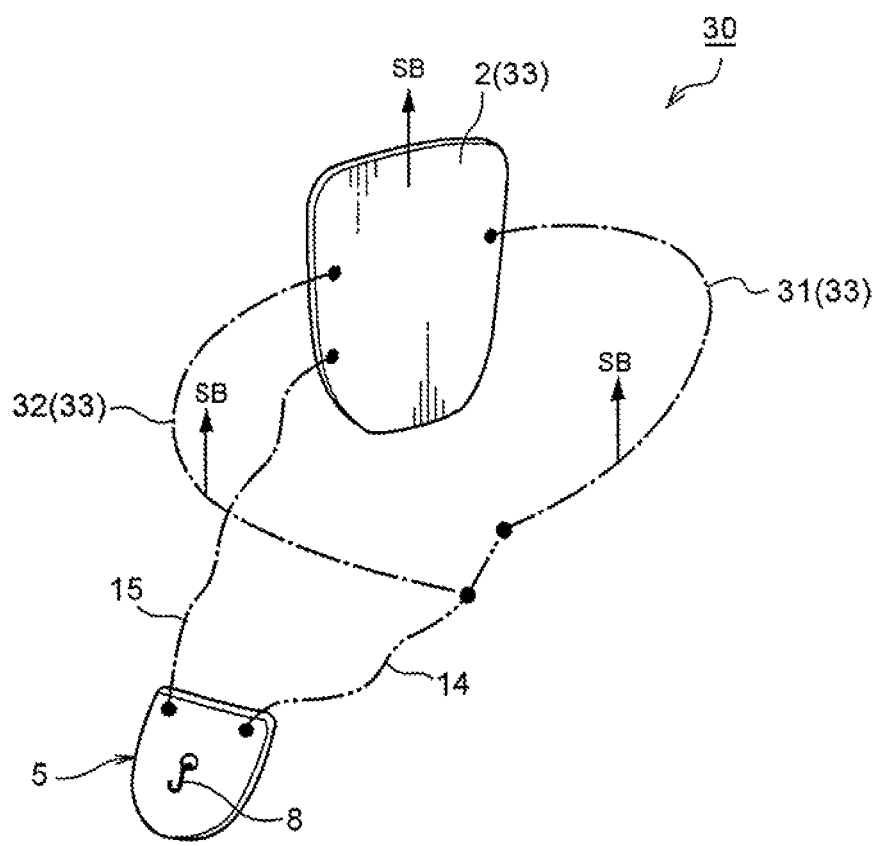
FIG. 17 shows a schematic diagram of a shoulder harness disclosed in Japanese Patent Laid-Open No. 2005-143453.

FIG. 13 shows a sectional diagram taken along X13-X13 in FIG. 12. The relay member 120 is composed of a plate-like molding made of plastic. As is well understood from FIG. 13, the relay member 120 has a shape in which an upper end portion thereof is inclined outward, i.e., in a direction to separate from the body of an operator. That is, an upper end portion 120a of the relay member 120 extends upward while being inclined diagonally in the direction to separate from the side of the body of an operator as viewed in side view. The hanging member 122 is locked to the upper end portion 120a. Reference character 120b in FIG. 13 denotes an opening through which the waist belt 132 is inserted.

As described above, the upper end portion 120a of the relay member 120 is inclined in the direction to separate from the body of an operator (an inclination angle of 60 degrees), and the hanging member 122 is positioned on the inclined upper end portion 120a. Therefore, the relay member 120 tends to escape in the direction to separate from the side of the body of an operator due to the load of the work machine. In other words, if the relay member 120 has a flat plate shape, the relay member 120 tends to bite into the body of an operator due to the load of the work machine. Also, in a case in which the hanging member 122 is positioned on an intermediate portion in a height direction, or a lower end portion of the relay member 120, the relay member 120 tends to bite into the body of an operator due to the load of the work machine. On the other hand, by employing the relay member 120 having the shape in which the upper end portion 120a is inclined outward as shown in FIG. 13, the relay member 120 can be prevented from biting into the body of an operator during work.

The present invention can be favorably applied to any portable work machine, such as a brush cutter, a pole pruner (a portable work machine where a chain saw-type saw blade working section is attached to the tip of a long main pipe), and a shaft hedge trimmer (a portable work machine where a reciprocating blade working section is attached to the tip of a long main pipe), which can be used by an operator by hanging from a region around the waist of the operator.

EXPLANATION OF REFERENCE NUMERALS

100 Shoulder Harness of Embodiment
102 Back Member
104 Shoulder Belt
104L Left Shoulder Belt
104R Right Shoulder Belt
106 Armpit Belt
108 Joint Buckle
108L Left Buckle Element of Joint Buckle
108R Right Buckle Element of Joint Buckle
110 Auxiliary Belt (Left Shoulder Belt-Armpit Belt)
112 Harness Network
114 Locking Device
116 Hip Pad
120 Relay Member
120a Upper End Portion of Relay Member
120b Insertion Opening for Waist Belt
122 Hanging Member
124 Front Suspension Belt
126 Rear Suspension Belt
132 Waist Belt
140 Main Frame of Back Member
142 Downward Extension Frame of Back Member
146 Back Pad Assembly
148 Back Pad Cushion
150 Back Pad Body

What is claimed is:
1. A shoulder harness for a portable work machine comprising:
a back member that is to be located on a back of an operator, said back member including a main frame, to which a downward extension frame connected with a waist belt is detachably attached;
right and left shoulder belts that respectively extend from right and left upper end portions of said back member;
a joint buckle that is to be located on a chest of said operator, distal ends of said right and left shoulder belts being connected to said joint buckle;

a hip pad that is to be located on a side of a waist of said operator, and is provided with a locking device, to which a work machine is connected;

a relay member that is located above said locking device, and is connected to said locking device by a hanging member which is composed of a band-like belt;

a rear suspension belt that is connected to said relay member and said back member;

a front suspension belt that is connected to said relay member and said joint buckle;

a mechanism for attaching and detaching said downward extension frame to and from said main frame, including a first shape portion formed in said main frame, and a second shape portion formed in said downward extension frame, wherein said downward extension frame is attachable to and detachable from said main frame by engagement and disengagement between said first and second shape portions; and an armpit belt that extends along an armpit on one side of said operator from said back member, wherein a distal end of said armpit belt is connected to said joint buckle.

2. The shoulder harness for a portable work machine of claim 1, wherein said first shape portion of said main frame and said second shape portion of said downward extension frame are engageable or disengageable without using a tool.

3. The shoulder harness for a portable work machine of claim 2, wherein said main frame and said downward extension frame are plastic moldings, said first shape portion is integrally formed in said main frame, and said second shape portion is integrally formed in said downward extension frame.

4. The shoulder harness for a portable work machine of claim 1, wherein said back member includes said downward extension frame, to which said waist belt is connected, and said relay member is connected to said waist belt.

5. The shoulder harness for a portable work machine of claim 1, further comprising an auxiliary belt that is connected to a distal end portion of said armpit belt and a distal end portion of said right or left shoulder belt on the side where said armpit belt is located.

6. The shoulder harness for a portable work machine of claim 1, further comprising a back pad assembly that is attachable to and detachable from said main frame, wherein said back pad assembly includes a back pad cushion, said back pad cushion includes a back pad body that is to be located on a back of said operator, and said right and left shoulder belts respectively extend from right and left upper ends of said back pad body.

7. The shoulder harness for a portable work machine of claim 1, wherein said front suspension belt and said rear suspension belt are composed of a single continuous belt, and a front end portion of said single belt is detachably connected to said joint buckle, and a rear end portion of said single belt is detachably connected to said main frame.

8. The shoulder harness for a portable work machine of claim 1, wherein one shoulder belt located opposite to said locking device, out of said right and left shoulder belts, is formed in a curved shape, and said curved shoulder belt has a curved shape gradually displaced to an inner side while extending to a front of said operator along a shoulder from said back of said operator.

9. The shoulder harness for a portable work machine of claim 1, wherein said relay member is composed of a plate member, an upper end portion of said relay member has a shape inclined in a direction opposite to the operator to separate from said operator, and said hanging member is connected to said inclined upper end portion.

10. The shoulder harness for a portable work machine of claim 1, wherein a length of said handing member is adjustable.

* * * * *